Dec. 9, 1952  R. E. BROWN  2,620,980
COUNTING DEVICE

Filed Feb. 5, 1951  7 Sheets-Sheet 1

RALPH E. BROWN,
INVENTOR.

BY *George W. Smyth*

ATTORNEY.

Dec. 9, 1952 — R. E. BROWN — 2,620,980
COUNTING DEVICE

Filed Feb. 5, 1951 — 7 Sheets-Sheet 2

RALPH E. BROWN,
INVENTOR.

BY George W. Smyth

ATTORNEY.

Dec. 9, 1952 R. E. BROWN 2,620,980
COUNTING DEVICE
Filed Feb. 5, 1951 7 Sheets-Sheet 4

Fig. 9.

RALPH E. BROWN,
INVENTOR.

BY George V. Smyth
ATTORNEY.

Dec. 9, 1952  R. E. BROWN  2,620,980
COUNTING DEVICE
Filed Feb. 5, 1951  7 Sheets-Sheet 5

RALPH E. BROWN,
INVENTOR.

BY George J. Smyth

ATTORNEY.

Dec. 9, 1952  R. E. BROWN  2,620,980
COUNTING DEVICE
Filed Feb. 5, 1951  7 Sheets-Sheet 7

Fig. 10c.

RALPH E. BROWN,
INVENTOR.

BY
ATTORNEY.

Patented Dec. 9, 1952

2,620,980

UNITED STATES PATENT OFFICE 2,620,980

COUNTING DEVICE

Ralph E. Brown, Los Angeles, Calif., assignor to Douglas Aircraft Company, Inc., Santa Monica, Calif.

Application February 5, 1951, Serial No. 209,427

22 Claims. (Cl. 235—92)

This invention relates to counting or computing devices wherein the changing positions of a master member, for example a rotary member, are translated into corresponding numerical values for use in indicating relative positions of the member as well as magnitudes of movement. For the purpose of disclosure the invention will be described as applied to the measurement of rotation of a master member such as a shaft representing the changing values of a variable that is to be computed, other applications of the invention being readily apparent to those skilled in the art.

It is contemplated that the invention in its preferred form will be flexible and have a wide range of usefulness in that it may be used either to indicate the derived values by suitable, sensible signals or to feed discrete electrical values to a remote recorder or other device and will be capable of deriving and signaling negative values as well as positive values with reference to some predetermined boundary or starting point.

The present disclosure is addressed largely to the solving of certain problems that must be met to put this general concept into practice, especially problems stemming from the necessity of using physical structure to subdivide movement into units for the purpose of numeration.

The selection of any system of numeration requires that a complete rotation of the master member be considered as divided into a series of equal or aliquot parts representing integers and any random position of the master member must be considered as lying within one of these parts or subdivisions. A computing device designed for the selected system of numeration must employ corresponding structural elements to represent the equal parts, for example a circular series of electrical segments together with a cooperating means such as an electrical contact, which contact by suitably provided relative movement sweeps the series of segments in response to rotation of the master member.

A problem involving structural considerations arises because of two related facts. First, the sweeping contact must be considered as a dimensionless point whereas the contact face necessarily has dimensions; and, second, the series of segments must be considered as having no spacing whatsoever or as having boundaries without thickness, whereas the individual segments are necessarily spaced apart for the electrical isolation.

If the width of the sweeping contact is less than the spacing of the segments, a random position of the master member may place the sweeping contact in an isolated position between two adjacent segments without flow of operating current through either of the segments. On the other hand, if this difficulty is avoided by using a wider contact, the contact may stop at a position bridging two adjacent segments to register two conflicting values simultaneously.

This problem of making the sweeping contact function in effect as a dimensionless point moving across dimensionless boundaries is solved by introducing at each boundary position of the contact an automatic rapid increment of relative movement across the boundary. While this increment of movement or snap action across the boundary is initiated in response to movement of the master member, it is nevertheless powered and completed independently of such movement once it is initiated. Thus a random rotation of the master member cannot bring the sweeping contact to a stationary position, either between or bridging two adjacent segments, because either the contact will be shifted by the master member to a stopping point within the area of one segment or will be shifted far enough to initiate the automatic snap action to carry the contact completely across the intervening gap to the next segment. Giving the relative movement of the sweeping contact this "either-or" characteristic makes the boundary between the segments in effect dimensionless for the purpose of numeration and also solves the problem of using a physical contact member to represent a mathematical point without dimensions.

In carrying out this concept of introducing automatic increments of motion at the segment boundaries, it must be remembered that a computing device of this type comprises a bank of counters each of which has such a series of segments swept by a contact and at certain junctures in the operation of the bank the completion of a traverse of one series of segments by a final increment of motion by the associated contact causes, when necessary, a step of advancement to be taken in one or more of the successive higher order counters and, of course, each of these consequent steps must also be taken with an increment of motion or snap action across the segment boundaries. For example, in a computing device designed for our numeration system based on ten digits, wherein three counters are interconnected to represent units, 10's and 100's respectively, adding one unit to the value 99 would necessitate an advance of one step by all three counters to the new value 100. The present invention includes means for causing these advances to occur automatically in the required sequence by a cascade action in which the automatic snap action of one counter is responsive to the automatic snap action in the adjacent counter of lower order.

In the cooperation between a circular series of segments and the co-acting contact, the basic advance movement of the contact derived directly from the movement of the master member and the added automatic snap action that is introduced at each segment boundary may combine to form various resultant movements or patterns of movement. For example, the automatic snap action may be in the same direction as the basic advance of the contact relative to the series of segments so that the relative movement of the contact is in one continuous direction but is periodically accelerated across each boundary in that direction. As another example, simple forward and back reciprocation may be imposed on the basic advance movement so that the contact advances and retreats or at least pauses or slows up within the area of one segment and then advances with a snap action to the next segment.

In regard to the resultant pattern of movement, a feature of the preferred form of the present invention is the concept of using components of movement in two directions, one component being the steady advance of the contact by the master member and the other, a lateral component, being the automatic increment. The resultant of these two components is a zig-zag pattern in which the contact snaps sidewise from one segment to the next succeeding segment. With the two components 90° apart the lateral component does not affect the progress of the contact in the direction in which it is moved by the master member.

To carry out this concept the segments must overlap with respect to the direction of advance and in the preferred practice of the invention a novel circular arrangement of what may be called Z-shaped segments is employed. To keep the lateral increments of motion from having an accumulative effect in displacing the sweeping contact a return increment of movement is introduced within the area of each segment. Thus the contact snaps laterally from one segment to another and subsequently snaps laterally back within the area of the second segment, each segment being Z-shaped in accord with this concept.

Another problem that is encountered in the use of physical structure to subdivide movement arises at the boundary between positive values and negative values (which is finite in the decimal counting system) since a discrepancy of one unit tends to be introduced in a device of the present type when a transition is made at the boundary unless some corrective expedient is introduced. The present invention provides such correction in a simple and reliable manner with minimum moving parts by introducing a compensating shift in electrical relationships as distinguished from mechanical compensation by actual physical shifting of cooperating parts for this purpose.

A further aspect of this problem arises at the boundary between negative and positive values inasmuch as the segments in the circular series necessarily have different digit values in the range of operation of the device for negative values than in the range of operation for positive values. The segments must be numbered backwards in the negative range of operation and a complication is introduced by the previously mentioned compensatory shift at the zero point, this compensation in effect shifting the circular series of segments by one step. The present invention meets this problem by a novel automatic switching arrangement which may best be explained later in describing the specific structure used in the preferred form of the invention.

It would ordinarily be expected that a device as complicated as necessary for computation up to any number of digits and constructed to incorporate the solutions to the above mentioned problems would be a large bulky mechanism with an exceedingly large number of moving parts. The present invention, however, is exceptionally compact and has but few separately moving parts.

A special feature of the invention is that it is designed for fabrication in what may be called standard counters or commutator units which may be assembled together in a gang or assembly of any number of interlocking units as may be required to handle summations of any number of digits.

The above and other features and advantages of the invention will be apparent in the following detailed description of the invention taken with the accompanying drawings.

In the drawings, which are to be regarded as merely illustrative,

Figure 10 is a diagram showing how Figures 10a, 10b, and 10c are to be considered as assembled together to make one large diagram; and Figures 10a, 10b and 10c taken together constitute a wiring diagram of the circuits and electrical elements lying exterior to the bank of counters shown in Figure 1.

*General arrangement*

Figure 1:
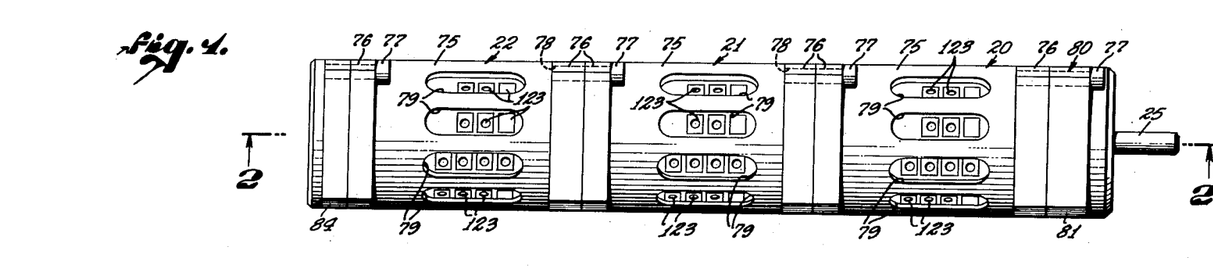
Figure 1 is a side elevation of a bank of three counters or counter units with all external wiring and electrical elements omitted for clarity of illustration.
Figure 2:
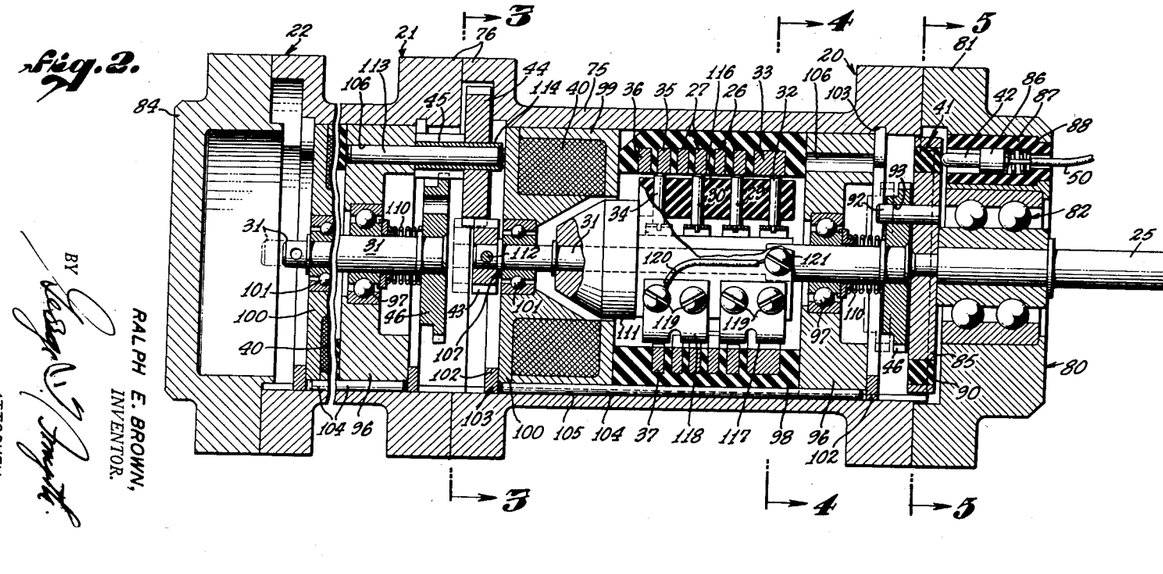
Figure 2 is a longitudinal section taken along the axis of the bank as indicated by the line 2—2 of Figure 1.

By way of example, Figures 1 and 2 show the structure of an assembly or bank of counters or commutation units, which bank comprises a unit counter, generally designated 20, a 10's counter, generally designated 21, and a 100's counter, generally designated 22, these three counters being actuated by an input shaft 25. The input shaft 25 may be termed the master member since it rotates in accord with the changing values of a variable that is to be computed and by its rotation imposes those values on the counter assembly.

As heretofore stated each of the counters in the bank includes a first electrical means in the form of a closed or circular series of segments and a second electrical means in the form of a contact adapted to sweep the series of segments by relative movement. While either of the electrical means may be fixed, preferably the series of segments are in fixed positions to represent the different rotary positions of a shaft that carries the coacting, sweeping contact.

The general arrangement may be understood by referring at this point to the schematic arrangement shown in Figure 9 which will now be discussed.

It is contemplated that the present preferred form of the invention may be used in conjunction either with a numerical recording system or with a visual signal system, or preferably in conjunction with both such systems simultaneously, and, therefore, each of the counters 20, 21, and 22 is of dual construction. Thus each counter incorporates a circular series of ten segments generally designated 26 for controlling a recording system and a duplicate circular series of ten segments generally designated 27 for controlling a visible signal system. In each counter, a contact 29 to sweep the series of segments 26 and a second contact 30 to sweep the second series of segments 27 are carried by a shaft 31. Shaft 31 also carries a third contact 32 that sweeps a continuous contact or contact ring 33, and carries a fourh contact 34 that cooperates with three fixed segments 35, 36, and 37.

In each of the counters, the shaft 31 is mounted for limited longitudinal or axial reciprocation in addition to rotation and reciprocates longitudinally in response to energization of a solenoid coil 40, thereby providing the aforementioned automatic increment of motion or snap action to carry the contacts on the shaft 31 from one segment to another.

Energization of the solenoid coil 40 in the units counter 20 is controlled by a special set of 10 segments 41 in cooperation with a contact 42, but each of the solenoid coils 40 in the higher order counters 21 and 22 is controlled by the contact 34 and the associated segments 35, 36, and 37 in the next lower counter. Thus the contact 34 in the unit counter 20 cooperating with the associated segments 35, 36, and 37 controls the solenoid coil 40 in the 10's counter 21, and the contact 34 in the 10's counter 21 cooperating with the associated segments 35 and 36 controls the solenoid coil 40 in the 100's counter 22.

The input shaft or master member 25 drives mechanism to cause relative movement between the contact 42 and the ten special segments 41 and is also directly connected to the shaft 31 of the units counter 20 to cause the first shaft 31 in the series to rotate synchronously with the input shaft. The shaft 31 of the units counter 20 is operatively connected to the shaft 31 of the 10's counter 21 by a series of four gears 43, 44, 45, and 46 to rotate the second shaft 31 at one tenth the speed of the first shaft 31, since the proposed computation is to be based on the decimal system with the rotation of each counter divided into ten parts. In like manner the second shaft 31 in the second counter 21 is connected to the third shaft 31 in the third counter 22 by a similar set of gears 43—46 to rotate the third shaft in the hundred's counter at one-tenth the rate of the second shaft in the ten's counter.

Figure 9:
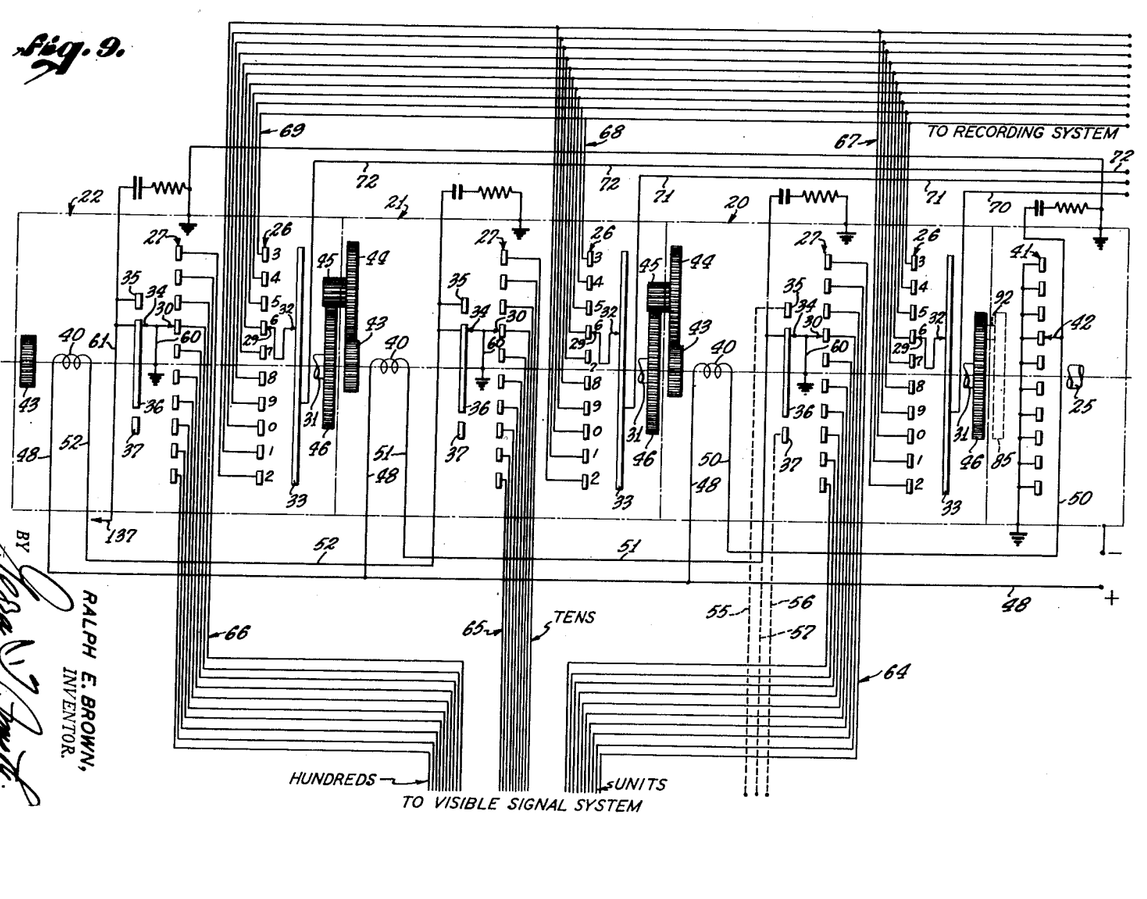
Figure 9 is a wiring diagram showing the electrical relationships incorporated in the bank of counters and their wiring connections to outside circuits.

The casing structure enclosing the mechanism of the counter assembly is indicated by dash-dot rectangles in Figure 9 and is shown as grounded at various points to serve as one side of different circuits involved in the electrical operation of the device.

One side of each of the three solenoid coils 40 is connected by a lead 48 from the positive or hot side of a suitable source of current. The negative or grounded side of the source of current is connected to the casing or ground of the counter assembly. The second side of the first coil 40 in the unit counter 20 is connected by a wire 50 to the moving contact 42, the circuit being completed by grounding the ten special contacts 41 as shown. The second side of the second coil 40 in the 10's counter 21 is connected by a wire 51 to the segment 36 in the unit counter and in like manner the second side of the third coil 40 in the 100's counter 22 is connected by a wire 52 to the segment 36 in the 10's counter 21.

The circumferential extent of each of the special segments 41 is one-twentieth of a circle or 18° and the spacing between the segments is of the same dimension so that the first solenoid coil 40 is energized for ten equal time periods and de-energized for ten alternate equal time periods in the course of one revolution of the first shaft 31 in the units counter 20. The purpose of the contact 34 and the three segments 35, 36, and 37 in the units counter 20 is to energize and de-energize the second coil 40 in the 10's counter 21 in the same manner, that is to say, ten times on and ten times off in the course of one rotation of the second shaft 31 in the 10's counter 21.

Since the first shaft 31 rotates ten times as fast as the second shaft 31, the desired energization of the 10's solenoid coil 40 for one-twentieth of a rotation of the second shaft is achieved simply by closing a circuit with the contact 34 in the units counter 20 during 180° of rotation of the first shaft 31 and the third solenoid coil 40 is energized for one-twentieth the rotation of the third shaft 31 in the same way.

A feature of the invention is the concept of using three segments in cooperation with the contact 34 in the units counter 20 instead of a single 180° segment thus to make possible what may be termed an electrical shift of 36° when desired in the timing of the energization of the 10's solenoid coil 40 relative to the rotation of the units shaft 31. For this purpose the central segment 36 cooperating with the contact 34 has a circumferential extent of 144° and each of the two adjacent contacts 35 and 37 cover an additional 36° or one-tenth of a revolution of the units shaft 31.

During normal operation of the units counter 20 in the range of positive values of the variable that is to be computed, the segment 35 is electrically connected to the segment 36 in the units counter 20 to make up the required 180° and such electrical connection may be permanent if the computing device is to be used only for positive values of the variable. In the range of operation for negative values of the variable, however, the segment 37 instead of the segment 35 is connected with the segment 36 to make up the required 180°, the result being an electrical shift of 36°. To make such a shift possible without the use of special moving parts within the structure of the counter assembly, a suitable external switching means is employed, the switching means in this instance being an electrical relay that will be described later. The segment 35 and the segment 37 are connected to the external relay by wires 55 and 56 respectively, the intersegment connection being completed by a wire 57 from the previously mentioned wire 51 to the relay.

In the arrangement just described the contact 34 and the cooperating segments 35, 36, and 37 constitute a rotary switch and the external relay is a second switch that shifts the point of operation of the rotary switch. The second switch may be termed a transition switch with respect to positive and negative values.

Since the described electrical shift is required only in the units counter 20, the segment 35 in the second or units counter 21 is shown permanently connected to the corresponding segment 36 by a wire 59 and the segment 37 in the ten's counter has no function. With each of the contacts 34 connected to ground by a wire 60, it is apparent how the circuits are completed to energize the solenoid coils 40.

A feature of the present preferred form of the invention is the concept of using less than half the range of operation of the highest order counter for positive values of the variable to be computed and less than the remaining half of the range of operation for negative values of the variable. A sufficient number of counters are assembled together to make this possible, only three counters being necessary in the present example to place the maximum contemplated value of the variable within half the range of operation of the highest order counter. The purpose in mind is to use the contact 34 in the highest order counter to control whatever shifts in the operation of the device are required in the transition from positive values to negative values including the previously mentioned 36° shift in the effectiveness of the contact 34 in the units counter 20.

For this reason the segment 35 in the highest order counter 22 is shown connected to a wire 61 leading to the exterior of the mechanism and the segment 35 is permanently connected with the segment 36, the segment 37 having no function.

Figure 9 shows a group of ten wires, generally designated 64, extending to the exterior of the device from the segments 27 in the units counter 20, a similar group of ten wires, generally designated 65, from the segments 27 of the 10's counter 21, and a third group of ten wires, generally designated 66, from the third counter 22, the purpose of the three groups being to control a suitable visible signal system such as a bank of lamps representing digits of totalizing numerals. Such signal lamps may be connected to one side of a suitable source of current, the other side of the source being grounded to complete the required circuits.

In like manner Figure 9 shows a group of ten wires, generally designated 67, extending to the exterior of the device from the ten segments 26 of the first counter 20. A similar group of ten wires, generally designated 68, extending to the exterior from the contacts 26 of the second counter 21, and a third group of ten wires, generally designated 69, from the third counter 22, these last three groups of wire being connected together as shown and connected to a suitable recording system for printing or otherwise recording the derived values of the variable that is being computed.

The recording circuits of the recording system are completed through the unit counter 20 by a wire 70 from the recording system connected to the ring contact 33, the associated contact 32 being connected to the contact 29 as shown. In like manner a wire 71 from the recording system is connected to the contact ring 33 of the 10's counter 21 and a third wire 72 is connected to the contact ring 33 of the counter 22. Thus a circuit from the external recording system through the wire 70 will ascertain what digit is to be used in the units order of the totalizing numeral, a circuit through the wire 71 will ascertain the 10's digit and the wire 72 will ascertain the 100's digit for the totalizing numeral to be made of record. The wires 70, 71 and 72 lead to corresponding terminals on the exterior of the device, which terminals are represented by the three wire ends in Fig. 9. These three terminals are connected to three corresponding switches in the recording system (not shown) that are closed one at a time to record the three orders of digits. Thus closing a switch to energize wire 70 while wires 71 and 72 are not energized will cause the units counter to energize one of the wires 67 to signal the units digit to the recording system; energizing wire 71 alone signals the 10's digit; and energizing the wire 72 alone signals the 100's digit.

*Mechanical structure of the assembly of counters*

A feature of the structure now to be described is the fabrication of counters in the form of standard units that are inter-changeable and are adapted to be assembled together and inter-connected to make a bank or assembly of any number of units to handle any desired maximum totalizing numeral. Thus the counters 20, 21, and 22 in the bank or assembly of counters in Figures 1 and 2 are all identical in structure.

In the present form of the invention each of the counters has a cylindrical casing 75 that is formed with two end flanges 76. As viewed from the end of the assembly, for example in Figure 3, each of the end flanges 76 has the configuration of a square of the same width as the diameter of the casing, thus providing four flange corners at each joint of the assembly. Suitable machine screws 77 extend into bores 78 in the flange corners to hold the assembly together. Each of the cylindrical casings 75 is provided with a series of peripheral windows 79 as shown in Figure 1 for making the numerous required connections with external wiring, such wiring being omitted from Figure 1 for the sake of clarity of illustration.

The units end of the bank of counters is covered by an end cap, generally designated 80, with an end flange 81, in which end cap the previously mentioned input shaft 25 is mounted by a suitable ball bearing generally designated 82. The opposite end of the assembly is closed by a blank cap 84 of similar configuration.

Figures 3, 4, 5:
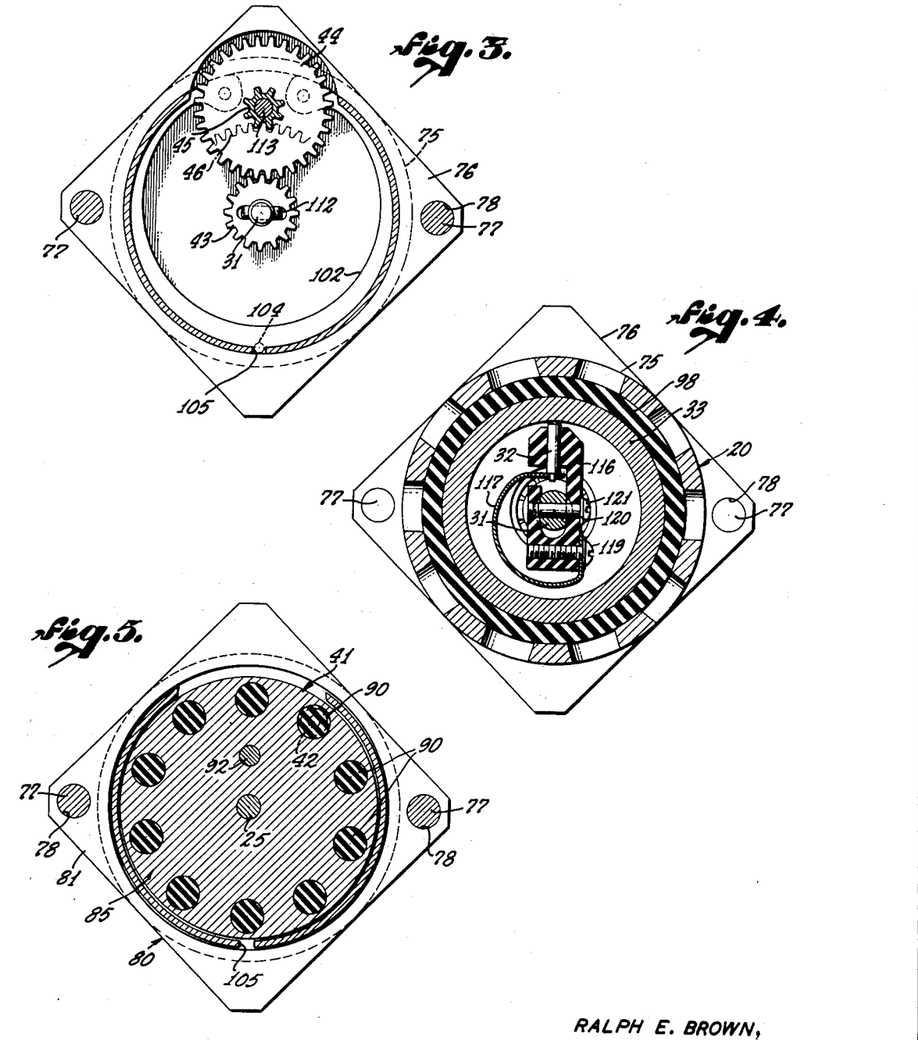
Figures 3, 4, and 5 are transverse sections taken as indicated by correspondingly numbered section lines 3—3, 4—4, and 5—5 in Figure 2.

Fixedly mounted on the inner end of the input shaft 25 is a commutator disc 85 for cooperation with the previously mentioned contact 42 that controls energization of the units solenoid coil 40. The contact 42 is in the form of a pin with a head 86 that is slidingly mounted in an insulating sleeve 87 in the end cap 80, the contact being continuously urged toward the commutator disc 85 by a compressed coiled spring 88. As shown in Figure 5 the metal commutator disc 85 has ten equally spaced inserts 90 of non-conducting material so that the metal of the commutator disc between the inserts serves as the previously mentioned ten grounded contacts 41 in the circuit for energizing the first solenoid coil 40. A suitable pin 92 extending from the commutator disc 85 into a bore 93 in a gear 46 may serve as means to operatively connect the input shaft 25 with the units counter shaft 31, the gear 46 being fixedly mounted on the end of the shaft 31. The teeth of the gear 46 have no function in the units counter 20, but as will be apparent, such teeth are necessary in the other counters.

The fixed internal structure inside each of the counters includes four members of cylindrical cross-sectional configuration, namely: a metal block 96 having a bearing 97 to support one end of the shaft 31; a cylinder 98 of non-conducting material in which are embedded the numerous segments of the counter; a cylindrical housing 99 for the solenoid coil 40; and, finally, a second metal block 100 in which is mounted a second bearing 101 to support the second end of the shaft 31. These four members are confined longitudinally between a pair of retaining rings 102 that seat in inner circumferential grooves 103 and the four are held in alignment against rotation by a suitable key in the form of a long pin 104 that seats in a keyway 105. The metal block 96 has a longitudinal bore 106 which has no function in the units counter 20.

The shaft 31 of each counter is slidingly mounted in its two bearings 97 and 101 for a short range of longitudinal reciprocation and when the corresponding solenoid core 40 is de-energized the shaft is in a rightward position as shown in Figure 2. The shaft is urged to its rightward position by a suitable coil spring 110 under compression between the bearing 97 and the gear 46 on the end of the shaft, the rightward shaft being limited by a fixed ring 107 on the shaft moving against the shaft bearing 101. When the solenoid coil 40 is energized it magnetically attracts a conical armature 111 that is fixedly mounted on the shaft 31, thereby shifting the shaft longitudinally to the left as viewed in Figure 2, the magnetic force being sufficient to overcome the resistance of the spring 110.

The second end of each shaft 31 fixedly carries the previously mentioned small gear 43 in the train of gears that operatively connects each counter with the adjacent counter of higher order. As shown in Figure 2 the small gear 43 in the units counter 20 is secured to the shaft 31 by a pin 112 and the gear 44 with which it meshes is supported by a pivot pin 113 seated in the previously mentioned bore 106 in the metal block 96 of the ten's counter 21. In the particular construction shown, the small gear 45 is mounted directly on the pivot pin 113 and has a tubular extension 114 on which the gear 44 is fixedly mounted. The gear 45 meshes with the gear 46 on the shaft 31.

Fixedly mounted on each shaft 31 is a contact assembly including a body 116 of non-conducting material which, as best shown in Figure 4, is hollowed out to receive the free ends of a pair of conducting leaf springs 117 and 118. Each of the leaf springs 117 and 118 has its base portion anchored to the body 116 by suitable screws 119 and each of the leaf springs is formed with two arms or free ends as shown in Figure 2. The two free ends of the leaf spring 117 carry the previously mentioned contacts 29 and 32 which are in the form of contact pins slidingly mounted in the body 116. Thus the leaf spring 117 serves as an insulated conductor for inter-connecting the two contacts 29 and 32.

In like manner the second leaf spring 118 on its two free ends carries the contacts 30 and 34 which are also in the form of contact pins slidingly mounted in the body 116. A suitable wire 120 connects the second leaf spring 118 with a screw 121 that anchors the body 116 on the shaft 31 thereby grounding the two contacts 30 and 34 as required by the wiring diagram in Figure 9.

Figures 6, 7:
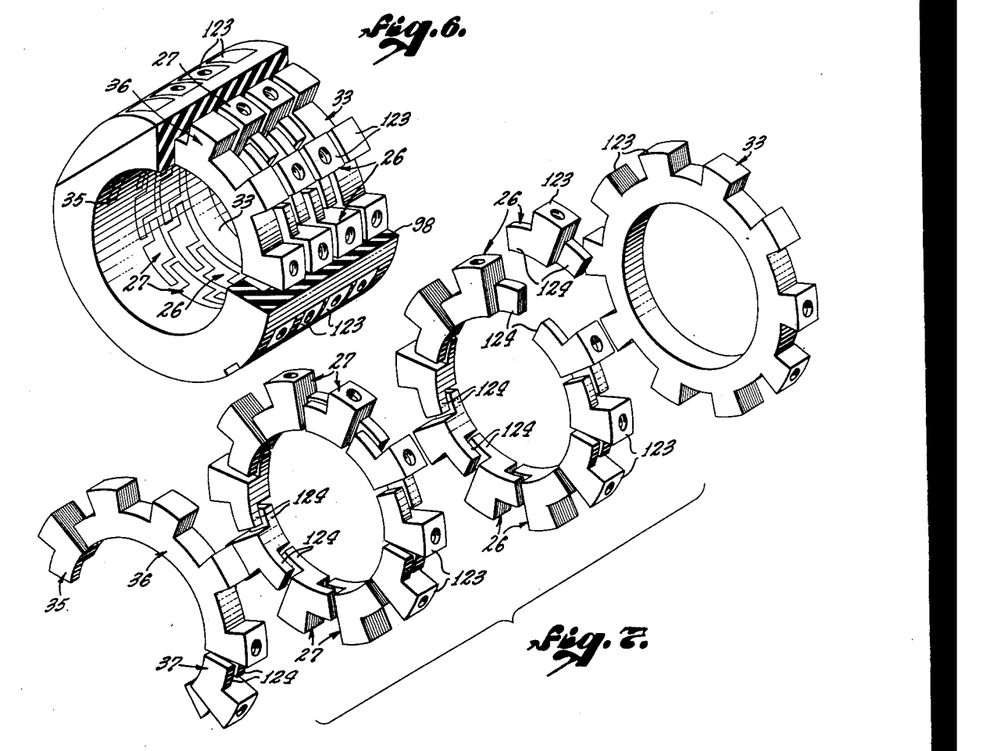
Figure 6 is a perspective view of one of the counter cylinders with a portion of the wall broken away to reveal the construction.
Figure 7 is an exploded view of the electrical segments assembled in the cylinder of Figure 6.
Figure 8:
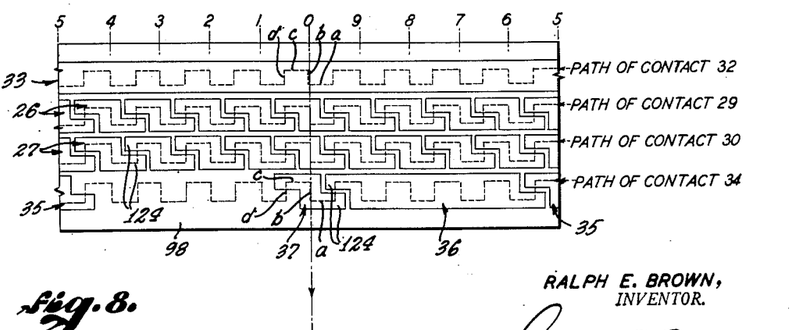
Figure 8 is a development of the interior surface of the counter cylinder of Figure 6.

Figures 6, 7, and 8 reveal the construction of the various segments that are embedded in the non-conducting cylinder 98. The contact ring 33 that cooperates with the contact pin 32 has a smooth interior surface along which the contact pin 32 moves and is shown with ten radial projections 123 that extend to the ten windows 79 of the counter casing 75 so that the contact ring may be wired to the exterior through any one of the windows. Each of the ten segments 26 is a metal body of the configuration shown with a radial projection 123 for wiring access through the corresponding window of the counter casing 75 and has an inner surface in the path of movement of the contact pin 29.

It will be noted that with respect to the circumferential direction of travel of the contact 29, each of the segments 26 overlaps the next adjacent segment. Thus, as indicated in Figures 7 and 8, an end portion 124 of one segment 26 extends alongside a corresponding end portion 124 of the next adjacent segment 26 so that the circumferentially traveling contact 29 may move from the area of one contact to the area of another contact by a lateral snap movement.

The segments 27 in the non-conducting cylinder 98 are constructed and arranged in the same manner as the segments 26 for cooperation with the contact pin 30. Each of the two segments 35 and 37 in the path of the contact pin 34 are of the same configuration and construction as the contacts 26 and 27. The segment 36 which extends over 144° and combined with either the segment 35 or the segment 37 to cover 180° has a plurality of the radial projections 123 to permit an external wiring connection through any one of four windows 79 in the counter casing 75 and has end portions 124 to overlap the end portions 124 of the two segments 35 and 37 as may be readily understood from an inspection of the diagram in Figure 8.

*Simple operation of the invention for positive values exclusively*

The assembly of counters as described to this point and wired as indicated in Figure 9 may be used for computations where all of the values of the variable are positive. It is to be remembered that the segment 35 in the units counter 20 is electrically connected to the segment 36 so that the two segments function as one continuous 180° segment. The digits represented by the various contacts 26 and 27 in the three counters are designated by numerals adjacent the contacts in Figure 9.

It will be noted that the segment 35 covers the same range of rotation as the digit 5 segments 26 and 27; that the segment 36 covers exactly the range of four successive segments 26 and 27 corresponding to digits 6, 7, 8 and 9, and that the segment 37 corresponds exactly to the zero value segments 26 and 27. When only positive values are desired, the full range of operation is available and the full cycle can be repeated indefinitely. Furthermore, since an external relay is not used for counting in the positive range, segments 35 and 36 may be permanently wired together if the device is to be used for positive values only.

As the special segments 41 are moved past the stationary contact 42 by rotation of the input shaft 25, the circuit through the first solenoid coil 40 in the units counter 20 is opened and closed ten times in the course of each rotation of the shaft 31 in the unit counter with the result that the shaft 31 carrying the four contacts 29, 30, 32, and 34 is reciprocated ten times, the separate axial movements of the shaft being separated by 1/20 of a rotation of the shaft.

As may be seen in Figure 8, the movement of a contact relative to a segment, may be divided into four stages starting at the point where the contact has first entered the area of the segment by a lateral snap movement. In the first stage $a$, starting in the end portion 124 of the segment, the solenoid coil 40 is energized to hold the shaft 31 in its leftward position as viewed in the drawing. Stage $b$ of the path is the snap action that occurs under the compulsion of the shaft spring 110 when the solenoid coil 40 is de-energized by the commutator wheel 85. Stage $c$ of the path is advance movement of the contact to the point where the solenoid coil is again energized at which point the contact traces stage $d$ of the path by snapping laterally from the end portion 124 of the segment to the adjacent end portion 124 of the next succeeding segment 26.

The direction of contact travel in Figure 9 for increasing positive values of the variable is from top to bottom. When the contact 34 in the units counter first snaps into the area of segment 35, the solenoid coil 40 of the 10's counter 21 is energized to cause all of the contacts in the 10's counter to snap laterally. Segments 35 and 36 of the units counter are interconnected to function as one continuous 180° segment so the four contacts of the 10's counter continue to advance without change in direction until the contact 34 of the units counter jumps laterally away from the segment 36, whereupon the solenoid coil 40 of the 10's counter is de-energized to permit the spring 110 in the 10's counter to shift all of the contacts, this return spring actuated movement being within the area of segments and not across the boundary lines between segments.

The so-called cascade action in which the various solenoid coils 40 in the counter assembly are automatically energized in proper sequence may be understood from the foregoing discussion. Energization of the first solenoid coil 40 by the action of the commutator disc 85 is required for the snap action that shifts the units contact 34 laterally onto the units segment 35 to energize the second solenoid coil 40 in the counter assembly and in the same way energization of the third solenoid coil 40 is consequent to energization of the second solenoid coil.

*Wiring diagram for operation in both positive and negative ranges*

While the wiring indicated in Figure 9 is adequate when only positive values are computed a more elaborate wiring arrangement for connecting the counter assembly to the recording system and the visible signal system is required when operation extends into the range of negative values as well as the range of positive values. A wiring diagram suitable for this dual purpose is shown in Figures 10a, 10b, and 10c combined as indicated in Figure 10.

Figure 10C:
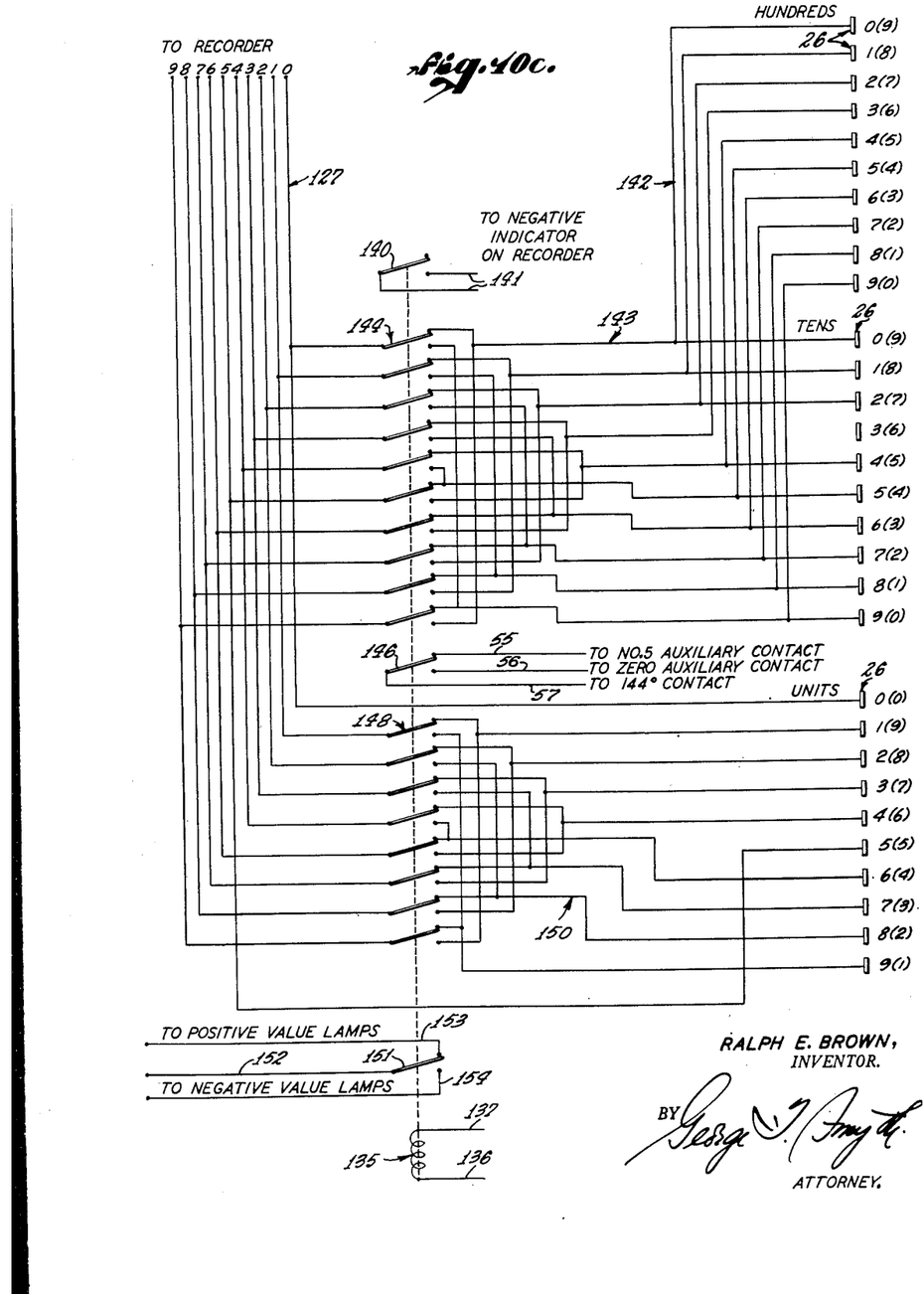

Figure 10c shows the segments 26 of the three counters with their digit values in the positive range shown by figures adjacent the segments and their digit values in the negative range shown by figures in parentheses. All thirty of the segments 26 in Figure 10c are intended to be connected in their proper order to a group of ten wires, generally designated 127 leading to the recording system, and, of course, the order in which the segments 26 are connected to the ten wires will change in accord with the digit values shown in parentheses when operation enters the range of negative values of the variable to be computed. Circuits through the ten wires 127 are completed by the previously mentioned wires 70, 71, and 72 from the contact rings 33 of the three counters respectively, as shown in Figure 9.

The segments 27 of the three counters are shown in Figures 10a and 10b with their positive digital values shown by adjacent numerals and their negative digital values shown by numerals in parentheses. The contacts 27 control two sets of signal lamps. The positive set of lamps comprises a row of ten lamps 128 for the units digits, a row of ten lamps 129 for 10's digits, and a row of 5 lamps 130 for 100's digits; the negative set comprises a row of 10 lamps 131 representing units digits, a row of 10 lamps 132 representing 10's digits, and a row of 5 lamps 133 representing 100's digits. The contacts 27 are connected to the positive signal lamps in correct order with means provided to shift their connections to the negative lamps whenever operation enters the negative range of values of the variable.

In the present preferred form of the invention all of the shifts and changes that must be made in the adjustment of the device when operation crosses the boundary between negative and positive values of the variable, are performed automatically by suitable relays under control of the 100's counter 22. For this purpose Figure 10c includes a 21-pole double-throw relay actuated by a relay coil 135. The relay is shown as de-energized to position its 21 poles for operation in the range of positive values. One side of the relay coil 135 is connected by a wire 136 to a suitable source of current and the other side is connected by a wire 137 to the two segments 35 and 36 in the 100's counter 22 as indicated in Figure 9. This external relay is energized when the last 100's decade tries to go from zero back to 999, in other words, the cascade effect continues through the last decade and thence to relay instead of another decade.

The uppermost relay pole 140 is used to indicate to the recording system when the values transmitted over the group of wires 127 are negative values. Whenever the device enters the range of negative values of the variable, energization of the relay coil 135 causes the pole 140 to swing from the position shown in Figure 10c to its alternate position thereby closing a circuit through the two wires 141 to the recording system.

Since the segments 26 in the 100's counter and the segments 26 in the 10's counter have the same sequences of positive and negative digit values, a group of ten wires, generally designated 142 in Figure 10c from the 100's counter is shown connected directly to a corresponding group of ten wires, generally designated 143, from the 100's counter. Each of the ten wires 143 has two branches and these 20 branches are distributed among the 20 contacts associated with the next ten poles, generally designated 144, of the 21-pole relay.

In the de-energized positions of the ten poles 144, shown in Figure 10c, the contacts 26 of the 100's and 10's counters are thus connected in their positive sequence to the group of ten wires 127 leading to the recorder. Energization of the relay coil 135 swings the ten poles 144 to their alternate positions thereby connecting the segments 26 of the 100's counter and 10's counter to the wires 127 in the sequence of the negative digital values of the segments. As previously explained, the wires 70, 71 and 72 of Figure 2 are energized one at a time in sequence by switches in the recording system, so that the wires 127 may be used first to signal the units digit to the recording system, then the 10's digit, and finally the 100's digit. This sequence may be carried out with high rapidity.

The next pole 146 in Figure 10c is the previously mentioned relay from which the wires 55, 56, and 57 extend to the segments 35, 37, and 36 respectively of the counter as shown in Figure 9 to create the previously mentioned electrical shift of 36° at the boundary point between positive and negative values of the variable. In the de-energized state of the relay coil 135 the pole 146 interconnects wires 55 and 57, as shown in Figure 10c, thereby connecting segment 35 to segment 36 in the units counter. When the relay coil 135 is energized, the pole 146 swings to its second position for the negative range of values, in which position the wire 56 is connected to the wire 57 thereby inter-connecting segments 36 and 37 in the units counter 20.

The function of the next eight poles, generally designated 148, is to shift the order in which the segments 26 of the units counter 20 are connected to the ten wires 127 when operation of the device crosses the boundary between positive and negative values. Only 8 poles are required for this purpose because the digital values 0 and 5 do not change and, therefore, the corresponding segments are directly connected to the group of wires 127. Each of the remaining 8 wires, generally designated 150, from the segments 26 in the units counter has two branches, the sixteen branches being distributed among the contacts for the 8 poles 148. In the de-energized positions of the poles 148, shown in Figure 10c, the 8 segments 26 are electrically connected to the corresponding wires 150 in their positive sequence and in the alternate energized positions of the 8 poles 148 the wires are connected in their negative sequence.

The last pole 151 of the 21-pole relay is connected to a suitable source of current by a wire 152 and swings from a de-energized position closing a circuit through a wire 153 as shown in Figure 10c to an alternate energized position to close a circuit through a second wire 154. As shown in Figure 10b, the wire 153 is connected to one side of all of the positive signal lamps 128, 129, and 130 and the wire 154 is connected to one side of all the negative signal lamps 131, 132, and 133.

Figures 10a and 10b together show how the various segments 27 of the three counters are connected to the various positive and negative signal lamps. The segments 27 of the units counter are connected by a group of ten wires 157 to the corresponding positive lamps 128 and are connected by a second group of ten wires 158 to the row of units lamps 131 in the negative set, the connections being made according to the correct positive and negative digital sequences of the contacts 27. In like manner the segments 27 in the 10's counter are connected by a group of ten wires, generally designated 159, to the positive row of 10's lamp 129 and are inter-connected by a second group of ten wires, generally designated 160, to the negative row of 10's lamps 132.

The segments 27 of the 100's counter are divided into two groups. The segments having positive digit values from 0 to 4 are connected by a group of 5 wires, generally designated 161, to the corresponding row of 5 positive lamps 130 and the other five segments representing negative digit values from 0 to 4 are connected by a second group of five wires, generally designated 162, to the five negative 100's lamps 133.

*Operation through both positive and negative ranges of value*

The operation of the described device in the range of positive values of the variable to be computed has already been explained. Of interest now is what occurs automatically when the value of the variable drops to zero and enters the negative range of computation.

As the count descends the scale to 001 and on down to 000 the various contacts merely retrace their paths and nothing happens in the external relay system until the next step in which the units counter drops to 9 which in turn drops the 10's counter to 9 and then the 100's counter to 9. This cascade action in which the 9's appear is only momentary because it results in the contact 34 in the 100's counter snapping into the area of the segment 36 to energize the external relay coil 135, whereupon the relay action shifts the numbers to read "minus 001."

The shift is caused by the following relay actions: relay pole 149 closes the circuit to the recording system that indicates that the values are now to be recorded in the negative range; the ten poles 144 and the eight poles 148 shift their positions to connect the various segments 26 of the three counters to the recorder in sequence of their negative digit values; the pole 151 shifts to energize the negative value signal lamps; and the relay pole 146 shifts to disconnect the segment 35 in the units counter from the segment 36 and instead to connect the segment 37 to the segment 36.

When the value of the variable being computed shifts back from the negative range to the positive range the relay coil 135 will again be de-energized to shift all the relay poles to their normal positions for positive values.

Although the now preferred embodiment of the present invention has been shown and described herein, it is to be understood that the invention is not to be limited thereto, for it is susceptible to changes in form and detail within the scope of the appended claims.

I claim:

1. A computing device of the character described having in combination: a master member for movement in accord with changes in the values of a variable that is to be computed; a first electrical means having a series of equally dimensioned and equally spaced insulated segments arranged in a line, each of said segments having portions spaced laterally from the two adjacent segments whereby the segments overlap with respect to the direction of said line; a second electrical means having a contact to cooperate with said line of segments, one of said electrical means being operatively connected with said master member for movement relative to the other electrical means to cause said contact to move along said line; and automatic means operatively connected to one of said electrical means to cause lateral movement of said contact relative to the direction of said line at a predetermined point along each of said segments, thereby to cause the contact to snap from one segment to another to avoid pause of the contact between two segments.

2. A computing device as set forth in claim 1 which includes means to cause opposite lateral relative movement of said contact within the boundaries of each of said segments.

3. A computing device as set forth in claim 1 in which one of said electrical means is concentric to the other and said automatic means causes one of the electric means to shift in the direction of its axis of rotation.

4. A computing device as set forth in claim 3 in which the power for the lateral movement is provided by a solenoid operatively connected with one of said electrical means.

5. A computing device as set forth in claim 1 in which said two electrical means are one pair in a series of similar pairs of electrical means that are interlocked for operation at different rates corresponding to multiples of the number of said segments in each pair, and in which said automatic means is responsive to the operation of the pair operating at the next higher rate.

6. A computing device as set forth in claim 5 in which said automatic means is controlled by a switch operated by said next higher rate pair.

7. A computing device of the character described having in combination: a master member for movement in opposite directions from a zero reference point in accord with changes in positive and negative values of a variable; a first step-by-step counter comprising a circular series of a given number of insulated segments and a contact to traverse said series by relative motion in response to movement of said master member; at least one additional similar step-by-step counter combined with said first counter to form a bank of counters corresponding to integers of different orders in a summation numeral, said counters being interlocked for operation at rates varying progressively as multiples of said given number, with the counter of the lowest order operating at the highest rate; means responsive to operation of the lowest order counter to a given point in its cycle to cause the contact in the next higher order counter to snap from one of its coacting segments to another to avoid pause between segments; and means to shift said point in the cycle in one direction by one step of the lowest order counter in response to movement of said master member across said zero point in one direction and to shift said point one step in the opposite direction in response to movement of the master member oppositely across the zero point.

8. A computing device as set forth in claim 7 in which said shift is controlled by means responsive to the highest order counter in the bank.

9. A computing device as set forth in claim 7 in which said snapping means is controlled by a first switch means operated by the lowest order counter and in which a second switch means operated by the highest order counter shifts the point of operation of the first switch means one step in the cycle of operation of said first counter.

10. A computing device of the character described having in combination: a master member for movement in opposite directions from a zero reference point in accord with changes in positive and negative values of a variable; a first step-by-step counter comprising a circular series of a given number of insulated segments and a contact to traverse said series by relative motion in response to movement of said master member; at least one additional similar step-by-step counter combined with said first counter to form a bank of counters corresponding to integers of different order in a summation numeral, said counters being interlocked for operation at rates varying progressively as multiples of said given number with the counter of the lowest order operating at the highest rate; a circular switch operatively connected with the lowest order counter; said switch having a switch contact and two circumferentially spaced segments for alternate cooperation with said switch contact; means responsive to said switch to cause the contact in the next higher order counter to jump from one of its coacting segments to another to avoid pause between segments; and a transition switch movable between two alternate positions to make said two alternate segments respectively parts of circuits to be controlled by said switch contact, said transition switch being responsive to movement of said master member across said zero point to cause the point of operation of said circular switch to shift in the cycle of operation of said lowest order counter whenever said variable changes in value from negative to positive or vice versa.

11. A computing device as set forth in claim 10 in which said transition switch is operated by the highest order counter.

12. A computing device as set forth in claim 10 in which said circular switch includes a long segment of circumferential extent one step less than 180° of rotation and said two circumferentially spaced segments are adjacent opposite ends of said long segment and are each of one step in extent so that either one combined with the continuously effective segment covers 180° of rotation.

13. A computing device as set forth in claim 7 in which said snapping means is controlled by a first switch means operated by the lowest order counter and in which said shifting means is a second switch means that is operated by the highest order counter and shifts the point of operation of the first switch means one step in the cycle of operation of said first counter.

14. A computing device of the character described having in combination: a master member for movement in opposite directions from a zero reference point in accord with changes in positive and negative values of a variable; a first step-by-step counter comprising a circular series of a given number of insulated segments and a contact to traverse said series by relative motion in response to movement of said master member; at least one additional similar step-by-step counter combined with said first counter to form a bank of counters corresponding to integers of different order in a summation numeral, said counters being interlocked for operation at rates varying progressively as multiples of said given number with the counter of the lowest order operating at the highest rate; a circular switch operatively connected with the lowest order counter, said switch having a switch contact and two circumferentially spaced segments for alternate cooperation with said switch contact; means responsive to said switch to cause the contact in the next higher order counter to jump from one of its coacting segments to another to avoid pause between segments; a transition switch movable between two alternate positions to make said two alternate segments respectively parts of circuits to be controlled by said switch contact, said transition switch being responsive to the highest order counter to cause the point of operation of said circular switch to shift in the cycle of operation of said lowest order counter whenever said variable changes in value from negative to positive and vice versa; a plurality of conductors for electrical connection with said segments to receive signals therefrom indicative of values of said variable; and switch means having one position interconnecting said segments and conductors for indicating positive values and a second position interconnecting said segments and conductors for indicating negative values, said switch means being responsive to the highest order counter for operation when said member moves past said zero point.

15. A computing device of the character described having in combination: a master member for movement in opposite directions from a zero reference point in accord with changes in positive and negative values of a variable; a first step-by-step counter comprising a circular series of a given number of insulated segments and a contact to traverse said series by relative motion in response to movement of said master member; at least one additional similar step-by-step counter combined with said first counter to form a bank of counters corresponding to integers of different order in a summation numeral, said counters being interlocked for operation at rates varying progressively as multiples of said given number with the counter of the lowest order operating at the highest rate; a circular switch operatively connected with the lowest order counter, said switch having a switch contact and two circumferentially spaced segments for alternate cooperation with said switch contact; means responsive to said switch to cause the contact in the next higher order counter to jump from one of its coacting segments to another to avoid pause between segments; a transition switch movable between two alternate positions to make said two alternate segments respectively parts of circuits to be controlled by said switch contact, said transition switch being responsive to highest order counter to cause the point of operation of said circular switch to shift in the cycle of operation of said lowest order counter whenever said variable changes in value from negative to positive and vice versa; means to indicate positive values of said variable including a first plurality of conductors connected with said segments to receive signals therefrom indicative of the positive values of said variable; means to indicate negative values of said variable including a second plurality of conductors connected with said segments to receive signals therefrom indicative of negative values of said variable; and switch means having one position to complete circuits including said first plurality of conductors and a second position to complete circuits including said second plurality of conductors, said switch means being responsive to the highest order counter for operation when said member moves past said zero point.

16. A computing device of the character described having in combination: a master member for movement in opposite directions from a zero reference point in accord with changes in positive and negative values of a variable; a bank of step-by-step counters corresponding to integers of different orders in a summation numeral, said counters being operated by said master member and being interlocked for operation at different rates in accord with their different orders; means cooperating with each of said counters to introduce a snap action in the step-to-step advance of each counter to avoid pause between steps, each of said cooperating means higher than the lowest order being responsive to the snap action of the next lower order when the lower order counter completes a cycle, whereby the counters snap in sequence with a cascade action from the lowest order to the highest when the completion of a cycle by the lowest order counter completes cycles of the other counters up to the highest order; and means responsive to said cascade action in the region of zero value of the variable to shift the order of the numerals indicated by the specific steps of the counters when operation of the counters shifts from the positive range of values to the negative range and vice versa.

17. A computer of the character described, including: a series of similar rotary counters constructed as separate units to be operatively connected together end to end coaxially to represent the integers of a number, each of said counters having a given number of segments and a cooperating contact with external terminals for electrical connection with the segments and contacts, each of said counters except one end counter having gearing for change in speed in accord with said given number as a factor, one of the end counters being adapted for external actuation to follow the changing values of a variable to be measured, each of said counters including electro-magnetic means to cause relative movement of its contact from segment to segment to occur with a snap action to prevent pause between segments; and an additional set of segments with cooperating contact to control the electro-magnetic means of the end counter that it externally actuated, each of the electro-magnetic means of the successive counters beyond the last mentioned end counter being energized by the preceeding counter; and means responsive to the highest order counter to shift the point in the cycle of the lowermost counter at which the snap action occurs in the next to lowest counter whenever the value of said variable changes from negative to positive and vice versa.

18. A computing device of the character described having in combination: a master member for movement in opposite directions from a zero reference point in accord with changes in positive and negative values of a variable; a first step-by-step counter comprising a circular series of a given number of insulated segments and a contact to traverse said series by relative motion in response to movement of said master member; at least one additional similar step-by-step counter combined with said first counter to form a bank of counters corresponding to integers of different orders in a summation numeral, said counters being interlocked for operation at rates varying progressively as multiples of said given number, with the counter of the lowest order operating at the highest rate; means responsive to operation of the lowest order counter to a given point in its cycle to cause the contact in the next higher order counter to snap from one of its coacting segments to another to avoid pause between segments; means to shift said point in the cycle in one direction by one step of the lowest order counter when said master member moves across said zero point in one direction and one step in the opposite direction when the master member moves oppositely across the zero point; a plurality of conductors for electrical connection with said segments to receive signals therefrom indicative of values of said variable; switch means having one position interconnecting said segments and conductors for indicating positive values and a second position interconnecting said segments and conductors for indicating negative values; and electromagnetic means operatively connected with said shifting means and said last mentioned switch for operation thereof in response to movement of said master member across said zero point.

19. A computing device as set forth in claim 18 in which said electromagnetic means is controlled by the highest order counter.

20. A computing device of the character described, including: a series of similar rotary counters constructed as separate units to be operatively connected together end to end coaxially in any number to represent any number of integers, each of said counters having a given number of segments and a contact movable relative to the given number of segments, each of said counters having an external terminal for each of said segments and an external terminal for said cooperating contact, each of said counters including an electromagnetic means to cause relative movement of the contact from segment to segment to occur with a snap action to prevent pause between segments, each of said counters except one end counter having gearing effective for change in speed in accord with said given number as a factor, one of the end counters being adapted for external actuation to follow the change in values of a variable to be measured.

21. A computing device as set forth in claim 20 in which each of said counters includes electromagnetic means to cause the relative movement of its contact from segment to segment to occur with a snap action to prevent pause between segments.

22. A computing device as set forth in claim 21 in which said segments overlap with respect to the rotary direction of operation and said electromagnetic means causes relative movement between the contact and the segments longitudinally of the counter to snap the contact from a portion of one segment to an overlapping portion of the next succeeding segment.

RALPH E. BROWN.

REFERENCES CITED

The following references are of record in the file of this patent:

UNITED STATES PATENTS

| Number | Name | Date |
|---|---|---|
| 2,207,743 | Larson et al. | July 16, 1940 |
| 2,496,585 | Harper | Feb. 7, 1950 |
| 2,551,093 | Bryce et al. | May 1, 1951 |
| 2,585,685 | Roggenstein et al. | Feb. 12, 1952 |